United States Patent
Ansari et al.

(10) Patent No.: US 8,410,946 B2
(45) Date of Patent: Apr. 2, 2013

(54) THERMAL MEASUREMENT SYSTEM AND METHOD FOR LEAK DETECTION

(75) Inventors: Adil Ansari, Kennesaw, GA (US); Rahul Jaikaran Chillar, Marietta, GA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/718,932

(22) Filed: Mar. 5, 2010

(65) Prior Publication Data

US 2011/0215936 A1    Sep. 8, 2011

(51) Int. Cl.
G08B 21/00    (2006.01)
G01J 5/00    (2006.01)
G01F 1/68    (2006.01)

(52) U.S. Cl. ........ 340/605; 340/619; 340/622; 374/125; 374/131; 73/204.23; 73/204.26

(58) Field of Classification Search .................. 340/501, 340/577, 578, 581, 587, 588, 589, 605, 619, 340/622; 73/204.22, 204.27, 114.68, 10, 73/53.05, 114.15, 204.23, 204.26, 204.7, 73/2; 374/4, 131, 125; 324/207.2; 700/258; 128/886

See application file for complete search history.

(56) References Cited

U.S. PATENT DOCUMENTS

| | | | |
|---|---|---|---|
| 3,771,350 A | 11/1973 | Romans | |
| 4,058,975 A | 11/1977 | Gilbert et al. | |
| 4,655,607 A | 4/1987 | Kern et al. | |
| 4,710,095 A | 12/1987 | Freberg et al. | |
| 5,099,121 A | 3/1992 | Allen | |
| 5,308,162 A * | 5/1994 | Amano et al. | 374/131 |
| 5,336,996 A * | 8/1994 | Rusnak | 324/207.2 |
| 5,385,202 A | 1/1995 | Drosdziok et al. | |
| 5,883,815 A * | 3/1999 | Drakulich et al. | 702/51 |
| 6,031,231 A | 2/2000 | Kimata et al. | |
| 6,422,745 B1 | 7/2002 | Glasheen et al. | |
| 6,644,095 B2 * | 11/2003 | Van Mullekom et al. | 73/10 |
| 6,748,733 B2 | 6/2004 | Tamaro | |
| 6,931,352 B2 * | 8/2005 | Cryer et al. | 702/182 |
| 6,931,857 B2 | 8/2005 | Irwin et al. | |
| 6,962,043 B2 | 11/2005 | Venkateswaran et al. | |
| 6,983,603 B2 | 1/2006 | Macchia | |
| 7,231,307 B2 | 6/2007 | Takei et al. | |
| 7,322,359 B2 * | 1/2008 | Ketchum | 128/886 |
| 7,332,716 B2 | 2/2008 | Hamrelius et al. | |
| 7,422,365 B2 | 9/2008 | Chamberlain et al. | |

(Continued)

FOREIGN PATENT DOCUMENTS

JP    61181921    8/1986
JP    8296453    11/1996

(Continued)

OTHER PUBLICATIONS

Infrared Detectors by A. Rogalski, published in FY 2000.*

(Continued)

*Primary Examiner* — Van T. Trieu
(74) *Attorney, Agent, or Firm* — Fletcher Yoder P.C.

(57) ABSTRACT

A system includes a controller configured to receive a signal from a thermal radiation sensor indicative of a temperature of a region including at least one fluid passage. The controller is also configured to detect a leak within the at least one fluid passage based on the signal.

23 Claims, 5 Drawing Sheets

U.S. PATENT DOCUMENTS

| | | | |
|---|---|---|---|
| 7,484,369 B2 | 2/2009 | Myhre | |
| 7,552,633 B2 * | 6/2009 | Tokuyasu et al. | 73/204.22 |
| 7,617,686 B2 | 11/2009 | Lilley et al. | |
| 7,974,739 B2 * | 7/2011 | Nelson et al. | 700/258 |
| 8,167,483 B2 | 5/2012 | Jensen | |
| 2004/0076218 A1 | 4/2004 | Tomlinson et al. | |
| 2007/0251663 A1 * | 11/2007 | Sheldon et al. | 164/455 |
| 2008/0166489 A1 | 7/2008 | Strock et al. | |
| 2009/0055071 A1 | 2/2009 | Way et al. | |
| 2009/0056910 A1 * | 3/2009 | Mallia et al. | 165/80.3 |
| 2009/0272122 A1 | 11/2009 | Shi et al. | |
| 2009/0285259 A1 | 11/2009 | Allen et al. | |
| 2010/0143090 A1 | 6/2010 | Smith et al. | |
| 2011/0240858 A1 | 10/2011 | Estevadeordal et al. | |
| 2011/0265443 A1 | 11/2011 | Ansari et al. | |
| 2011/0268149 A1 | 11/2011 | Chillar et al. | |
| 2012/0031106 A1 | 2/2012 | Chillar et al. | |
| 2012/0031581 A1 | 2/2012 | Chillar et al. | |
| 2012/0032810 A1 | 2/2012 | Chillar et al. | |

FOREIGN PATENT DOCUMENTS

| | | |
|---|---|---|
| JP | 2004170375 | 6/2004 |
| WO | 0122045 | 3/2001 |

OTHER PUBLICATIONS

U.S. Appl. No. 12/328,145, filed Dec. 4, 2008.
Search Report from corresponding EP Application No. 11153999.2 dated Sep. 5, 2011.

* cited by examiner

THERMAL MEASUREMENT SYSTEM AND METHOD FOR LEAK DETECTION

BACKGROUND OF THE INVENTION

The subject matter disclosed herein relates to a thermal measurement system and method for leak detection.

Detecting fluid leaks within a power generation system, a turbine system, an oil refinery, a processing plant, or other system including fluid passages may ensure efficient operation of the system. Early detection of the leak limits fluid loss and may ensure the integrity of the system. A variety of leak detection systems may be employed, such as visual based systems, resistivity measurement systems and/or vibration measurement systems. Unfortunately, such systems may be expensive to procure, install and maintain, and may not detect smaller leaks within the fluid passages. As a result, leaking fluid may accumulate before the leak is detected.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a thermal radiation sensor directed toward a region including at least one fluid passage. The thermal radiation sensor is configured to output a signal indicative of a temperature of the region. The system also includes a controller communicatively coupled to the thermal radiation sensor. The controller is configured to detect a leak within the at least one fluid passage based on the signal.

In a second embodiment, a system includes a controller configured to receive a signal from a thermal radiation sensor indicative of a temperature of a region including at least one fluid passage. The controller is also configured to detect a leak within the at least one fluid passage based on the signal.

In a third embodiment, a method includes measuring thermal radiation within a region including at least one fluid passage, and determining a temperature of the region based on the measurement. The method also includes detecting a leak within the at least one fluid passage based on the temperature of the region.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure may provide a cost-effective system and method for detecting a leak within a fluid passage by measuring thermal radiation emitted from a region including the fluid passage. For example, certain embodiments include a thermal radiation sensor directed toward a region including at least one fluid passage. The thermal radiation sensor is configured to output a signal indicative of a temperature of the region to a controller communicatively coupled to the thermal radiation sensor. The controller may be configured to detect a leak within the at least one fluid passage based on the signal. For example, the controller may compare a temperature of the region to a threshold value indicative of a fluid leak. Alternatively, the controller may compare a rate of temperature change to a threshold value indicative of a fluid leak. The controller may be coupled to a user interface configured to display a numerical and/or graphical representation of the temperature of the region. In certain embodiments, the controller may be configured to activate an audible and/or visual alarm upon leak detection to alert an operator to the condition. In further embodiments, the controller may be configured to terminate fluid flow through the at least one fluid passage upon detection of a leak. In this manner, flow through the fluid passage may be terminated prior to significant fluid leakage, thereby ensuring the integrity of a system which utilizes the fluid passage.

Because the thermal radiation sensor may be inexpensive to procure and install, the thermal measurement system may be less expensive to implement than other leak detection systems, such as optical leak detection systems or vibration monitoring systems. For example, optical leak detection systems may utilize a high resolution camera to scan for visual indications of leaking fluid. As will be appreciated, such high resolution cameras may be significantly more expensive than thermal radiation sensors, such as thermopiles. In addition, optical leak detection systems may employ lights to illuminate the region being monitored. Such lights may be expensive to install and replace due to their proximity to high temperature components within a turbine system, for example. Moreover, because a thermal radiation sensor may measure the temperature over a large area of the fluid passage, fewer thermal radiation sensors may be utilized within a system than high resolution cameras for a given coverage area.

In addition, the present thermal measurement system may provide increased accuracy over optical leak detection systems and/or vibration monitoring systems. For example, a vibration monitoring system may only detect vibrations associated with large crack formation within the fluid conduit. In contrast, the present thermal measurement system may be sensitive enough to detect smaller leaks, thereby identifying the crack before propagation. Consequently, the present leak detection system may inform an operator of the condition prior to significant fluid leakage, thereby ensuring the integrity of the system containing the fluid passages.

Figure 1:
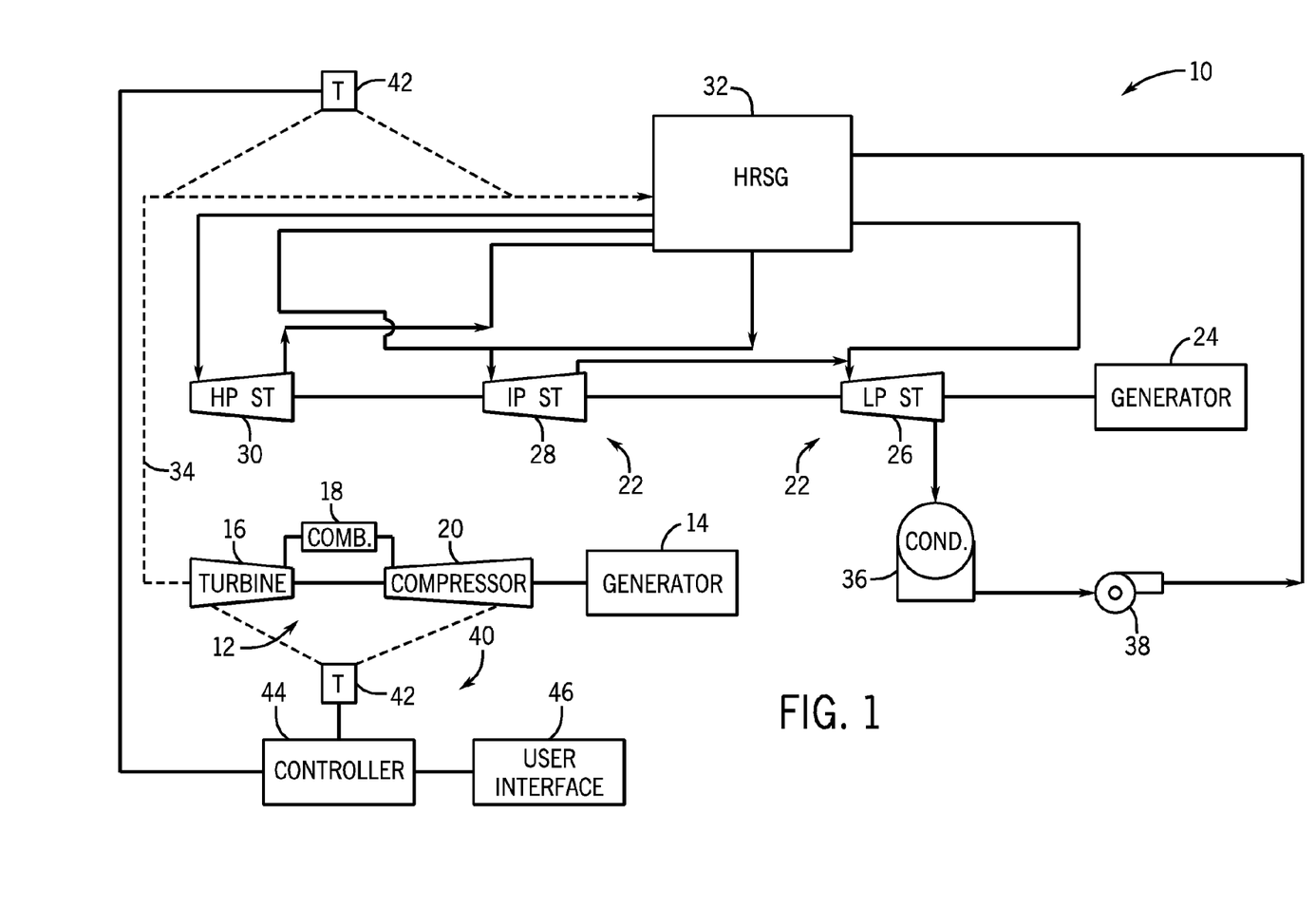
FIG. 1 is a schematic flow diagram of an embodiment of a combined cycle power generation system having a gas turbine, a steam turbine, an HRSG, and a thermal measurement system configured to detect leaks within fluid passages of the power generation system in accordance with certain embodiments of the present technique.

FIG. 1 is a schematic flow diagram of an embodiment of a combined cycle power generation system 10 having a gas turbine, a steam turbine, and a heat recovery steam generator (HRSG). The system 10 is described below for the purpose of providing context for embodiments of a thermal measurement system for detecting leaks within fluid passages. It should be appreciated that the thermal measurement system described below may be utilized for detecting fluid leaks within other power generation systems, turbine systems, processing plants, or any other system including fluid passages. The system 10 may include a gas turbine 12 for driving a first generator 14 for producing electrical power. The gas turbine 12 may include a turbine 16, a combustor or combustion chamber 18, and a compressor 20. The system 10 may also include a steam turbine 22 for driving a second generator 24. Although the gas turbine 12 and steam turbine 22 may drive separate generators 14 and 24, as shown in the illustrated embodiment, the gas turbine 12 and steam turbine 22 may also be utilized in tandem to drive a single load via a single shaft. In the illustrated embodiment, the steam turbine 22 may include one low-pressure section 26 (LP ST), one intermediate-pressure section 28 (IP ST), and one high-pressure section 30 (HP ST). However, the specific configuration of the steam turbine 22, as well as the gas turbine 12, may be implementation-specific and may include any combination of sections.

The system 10 may also include a multi-stage HRSG 32. The illustrated HRSG 32 is shown to convey the general operation of such HRSG systems. Heated exhaust gas 34 from the gas turbine 12 may be transported into the HRSG 32 and used to heat steam used to power the steam turbine 22. Exhaust from the low-pressure section 26 of the steam turbine 22 may be directed into a condenser 36. Condensate from the condenser 36 may, in turn, be directed into a low-pressure section of the HRSG 32 with the aid of a condensate pump 38.

The combined cycle power generation system 10 also includes a thermal measurement system 40 configured to detect fluid leaks within the power generation system 10. The thermal measurement system 40 includes thermal radiation sensors 42 directed toward respective regions of the power generation system 10. Each thermal radiation sensor 42 is configured to output a signal indicative of a temperature of the respective region. For example, in the illustrated configuration, one thermal radiation sensor 42 is directed toward the turbine system 12, while a second thermal radiation sensor 42 is directed toward a fluid passage which conveys the heated exhaust gas 34 from the gas turbine system 12 to the HRSG 32. However, it should be appreciated that further embodiments may include more or fewer thermal radiation sensors 42 directed toward other regions of the power generation system 10. For example, one or more thermal radiation sensors 42 may be directed toward the HP ST 30, IP ST 28, LP ST 26, HRSG 32 and/or fluid passages conveying steam between these elements of the power generation system 10. Yet further embodiments may include one or more thermal radiation sensors 42 directed toward the condenser 36, condensate pump 38 and/or fluid conduits extending between these components and the LP ST 26 and/or the HRSG 32. In addition, multiple thermal radiation sensors 42 may be directed toward different regions of an individual component of the power generation system 10 to measure the temperature within each region. For example, as discussed in detail below, the turbine system 12 may include multiple thermal radiation sensors 42 to detect the temperature of various fluid passages within the turbine system 12. Furthermore, it should be appreciated that the accuracy of the thermal measurement system 40 may be at least partially dependent on the field of view of the thermal radiation sensors 42. Consequently, thermal radiation sensors 42 which are directed toward a smaller region may produce a more accurate temperature measurement than thermal radiation sensors 42 directed toward a larger region.

As will be appreciated, a thermal radiation sensor 42 measures electromagnetic energy from an object to determine a temperature of the object. For example, the thermal radiation sensor 42 may measure thermal radiation having a frequency within an infrared spectrum. As discussed in detail below, the intensity of certain infrared emissions may be proportional to the temperature of the object. In certain embodiments, the thermal radiation sensor 42 is configured to detect such emissions and output a signal indicative of temperature. It also should be appreciated that various thermal radiation sensors 42 may be employed to determine the temperature of a region within the power generation system 10. For example, certain embodiments may employ a thermopile. As will be appreciated, a thermopile includes multiple thermocouples connected in series for obtaining an enhanced signal output. Thermocouples measure the temperature difference between hot and cold junctions by generating an electromotive force (emf) between the junctions. For example, the hot junctions may be directed toward the region to measure thermal radiation, and the cold junctions may be coupled to a heat sink such that a temperature of the cold junctions is substantially equal to the ambient temperature. Because the thermocouples are connected in series, the thermopile sums the emf of all the thermocouples to provide an enhanced voltage output. Alternative embodiments may employ radiation pyrometers, infrared detectors (e.g., CCD) or other thermal radiation sensors.

In the present embodiment, the thermal radiation sensors 42 are communicatively coupled to a controller 44. The controller 44 is configured to detect a leak within one or more fluid passages of the power generation system 10 based on the temperature signal output from the thermal radiation sensors 42. For example, if a crack develops within the fluid passage conveying the heated exhaust gas 34 from the gas turbine system 12 to the HRSG 32, the temperature of the region surrounding the fluid passage will increase due to the leaking gas. Consequently, the thermal radiation sensor 42 directed toward the fluid passage will output a signal indicative of a temperature increase within the region. The controller 44 will receive the signal and identify the fluid leak based on the increase in temperature. In this manner, leaks may be quickly detected, and appropriate corrective action may be taken.

Similarly, a steam leak may be detected by a thermal radiation sensor 42 directed toward fluid passages which convey steam throughout the power generation system 10. In addition, as discussed in detail below, a fluid leak within the turbine system 12 may be detected by one or more thermal radiation sensors 42 directed toward the turbine system 12. While a single controller 44 is employed in the present embodiment, it should be appreciated that alternative embodiments may include one controller for each thermal radiation sensor 42, or one controller for a group of sensors 42.

The present embodiment also includes a user interface 46 communicatively coupled to the controller 44. The user interface 46 may include a numerical display configured to display the temperature of each measured region within the power generation system 10 and/or a graphical interface configured to display the temperature as a function of time. In this manner, an operator may monitor the temperature to determine whether a fluid leak is present. In addition, the user interface 46 may include a visual and/or audible alarm configured to alert an operator if a leak is detected within a particular region of the power generation system 10. For example, if the controller 44 determines that a fluid passage is leaking based on the temperature of the surrounding region, an audible and/or visual alarm may be activated such that an operator may take appropriate action. In certain embodiments, the user interface 46 is communicatively coupled to the power generation system 10 and configured to automatically shut down fluid flow to the leaking passage. In this manner, the flow of fluid may be terminated prior to significant leakage, thereby ensuring the integrity of the power generation system 10.

Figure 2:
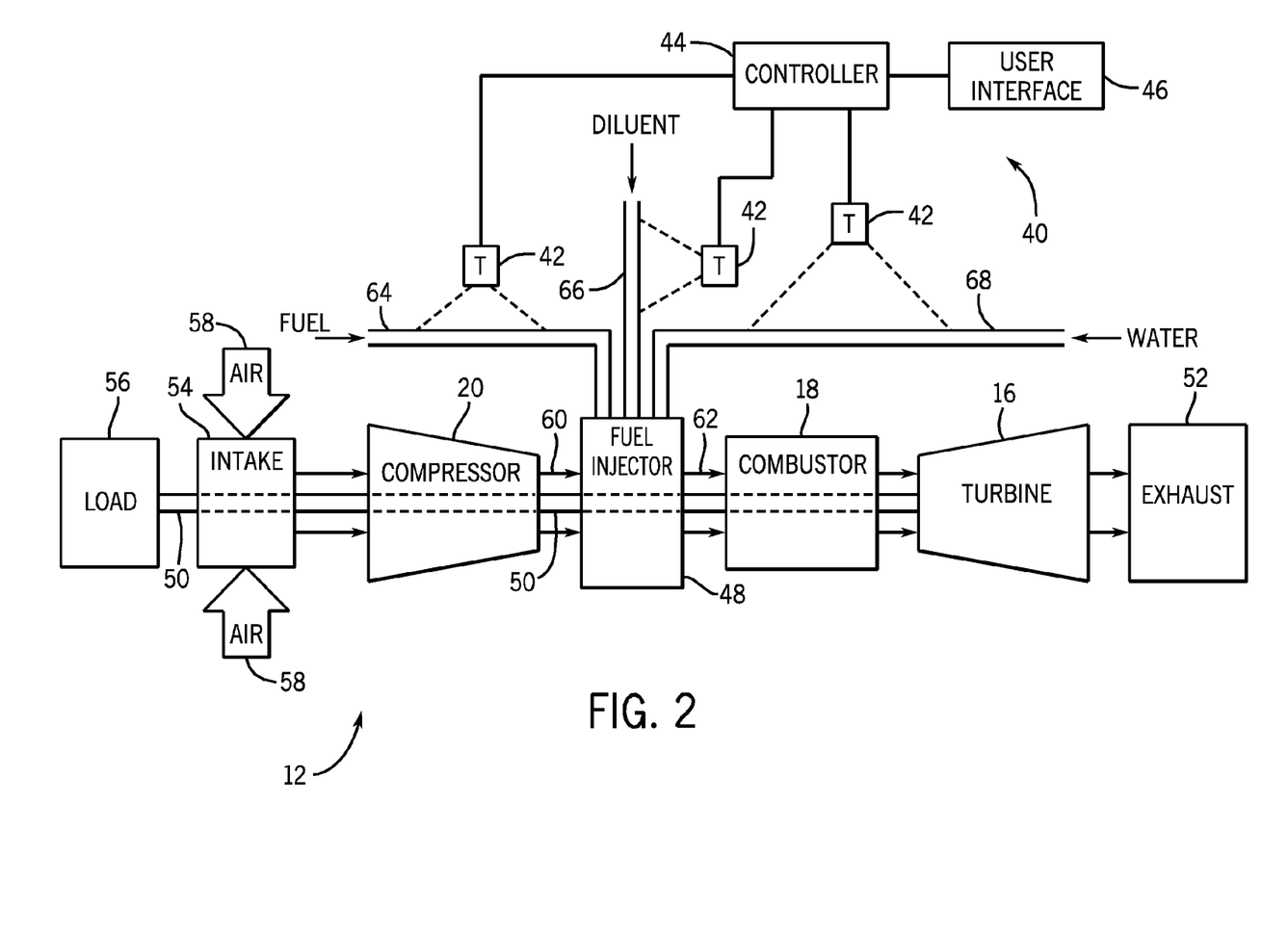
FIG. 2 is a block diagram of an embodiment of a gas turbine system including the thermal measurement system configured to detect leaks within fluid passages of the gas turbine system in accordance with certain embodiments of the present technique.

FIG. 2 is a block diagram of an embodiment of the gas turbine system 12 including the thermal measurement system 40 configured to detect leaks within fluid passages of the gas turbine system 12. The turbine system 12 includes a fuel injector 48 and the combustor 18. Liquid fuel and/or gaseous fuel, such as natural gas, is routed to the turbine system 12 through the fuel injector 48 into the combustor 18. As discussed below, the fuel injector 48 is configured to inject and mix the fuel with compressed air. The combustor 18 ignites and combusts the fuel-air mixture, and then passes hot pressurized exhaust gas into the turbine 16. The exhaust gas passes through turbine blades in the turbine 16, thereby driving the turbine 16 to rotate. Coupling between blades in the turbine 16 and a shaft 50 will cause the rotation of the shaft 50, which is also coupled to several components throughout the turbine system 12, as illustrated. Eventually, the exhaust of the combustion process may exit the turbine system 12 via an exhaust outlet 52.

In an embodiment of the turbine system 12, compressor blades are included as components of the compressor 20. Blades within the compressor 20 may be coupled to the shaft 50, and will rotate as the shaft 50 is driven to rotate by the turbine 16. The compressor 20 may intake air to the turbine system 12 via an air intake 54. Further, the shaft 50 may be coupled to a load 56, which may be powered via rotation of the shaft 50. As will be appreciated, the load 56 may be any suitable device that may use the power of the rotational output of the turbine system 12, such as an electrical generator or an external mechanical load. For example, the load 56 may include an electrical generator, a propeller of an airplane, and so forth. The air intake 54 draws air 58 into the turbine system 12 via a suitable mechanism, such as a cold air intake. The air 58 then flows through blades of the compressor 20, which provides compressed air 60 to the combustor 18. In particular, the fuel injector 48 may inject the compressed air 60 and fuel, as a fuel-air mixture 62, into the combustor 18. Alternatively, the compressed air 60 and fuel may be injected directly into the combustor 18 for mixing and combustion.

In the present embodiment, the fuel injector 48 is provided with fuel via a fuel conduit 64. As will be appreciated, the fuel conduit 64 may be configured to facilitate passage of a liquid fuel and/or a gaseous fuel to the fuel injector 48. For example, certain turbine systems 12 which utilize a liquid fuel preheat the fuel prior to flowing the fuel to the fuel injector 48. Consequently, the fuel within the fuel conduit 64 may be at an elevated temperature compared to the surrounding environment. Therefore, if a leak develops within the fuel conduit 64, the temperature of the region surrounding the conduit 64 may increase due to the presence of the heated fuel. In the present embodiment, a thermal radiation sensor 42 is directed toward the fuel conduit 64. As previously discussed, the thermal radiation sensor 42 is communicatively coupled to the controller 44 which detects a fluid leak based on the temperature of the region within a field of view of the sensor 42. As a result of this configuration, if a leak develops within the fuel conduit 64 and the temperature of the surrounding region increases, the thermal radiation sensor 42 will detect the increase in temperature and the controller 44 will identify the leak. Such a configuration may detect a fuel leak shortly after it develops such that an operator may terminate the flow of fuel through the conduit 64 prior to significant fuel leakage within the turbine system 12.

The present embodiment also includes a diluent conduit 66 configured to provide diluent (e.g., nitrogen, steam, etc.) to the fuel injector 48, and a water conduit 68 configured to provide water from a water injection system, for example, to the fuel injector 48. Similar to the fuel conduit 64, a second thermal radiation sensor 42 is directed toward the diluent conduit 66, and a third thermal radiation sensor 42 is directed toward the water conduit 68. In certain configurations, the water and/or diluent may be at a lower temperature than a region surrounding each respective conduit 66 and/or 68. Consequently, if diluent and/or water leaks from the respective conduit 66 and/or 68, the temperature of the surrounding region may decrease. Such a decrease in temperature may be detected by the second and/or third thermal radiation sensors 42, and relayed to the controller 44. Based on the decrease in temperature, the controller 44 will identify the leak and report the condition to the operator via the user interface 46. Once a diluent and/or water leak is detected the operator may manually terminate flow through the diluent conduit 66 and/or the water conduit 68. Alternatively, the controller 44 may be communicatively coupled to the turbine system 12 and configured to automatically terminate the flow based on detection of the leak.

In the present embodiment, the water conduit 68 is positioned adjacent to the turbine 16. During operation of the turbine 16, the temperature of a casing surrounding the turbine blades increases as hot exhaust gas from the combustor 18 flows through the turbine 16. In certain embodiments, the temperature of the casing may increase to more than approximately 700, 800, or 900 degrees Fahrenheit, or more. If a leak develops within the water conduit 68, water may contact the hot turbine casing. Due to the large heat capacity and latent heat of vaporization of the water, even small amounts of water contacting the casing may thermally shock the casing, thereby inducing deformation which may lead to contact between the turbine blades and the casing. Because the present thermal measurement system 40 is configured to quickly identify leaks within the water conduit 68, water flow may be terminated before a sufficient quantity of water contacts the turbine casing to induce deformation. Therefore, the present embodiment may substantially reduce or eliminate the possibility of contact between turbine blades and the surrounding casing due to thermal shock associated with water leakage. Furthermore, because a single thermal radiation sensor 42 may monitor a large section of the water conduit 68, the cost of implementing the present leak detection system may be significantly lower than alternative systems which may utilize vibration measurement, resistivity, or optical detection, for example.

Figure 3:
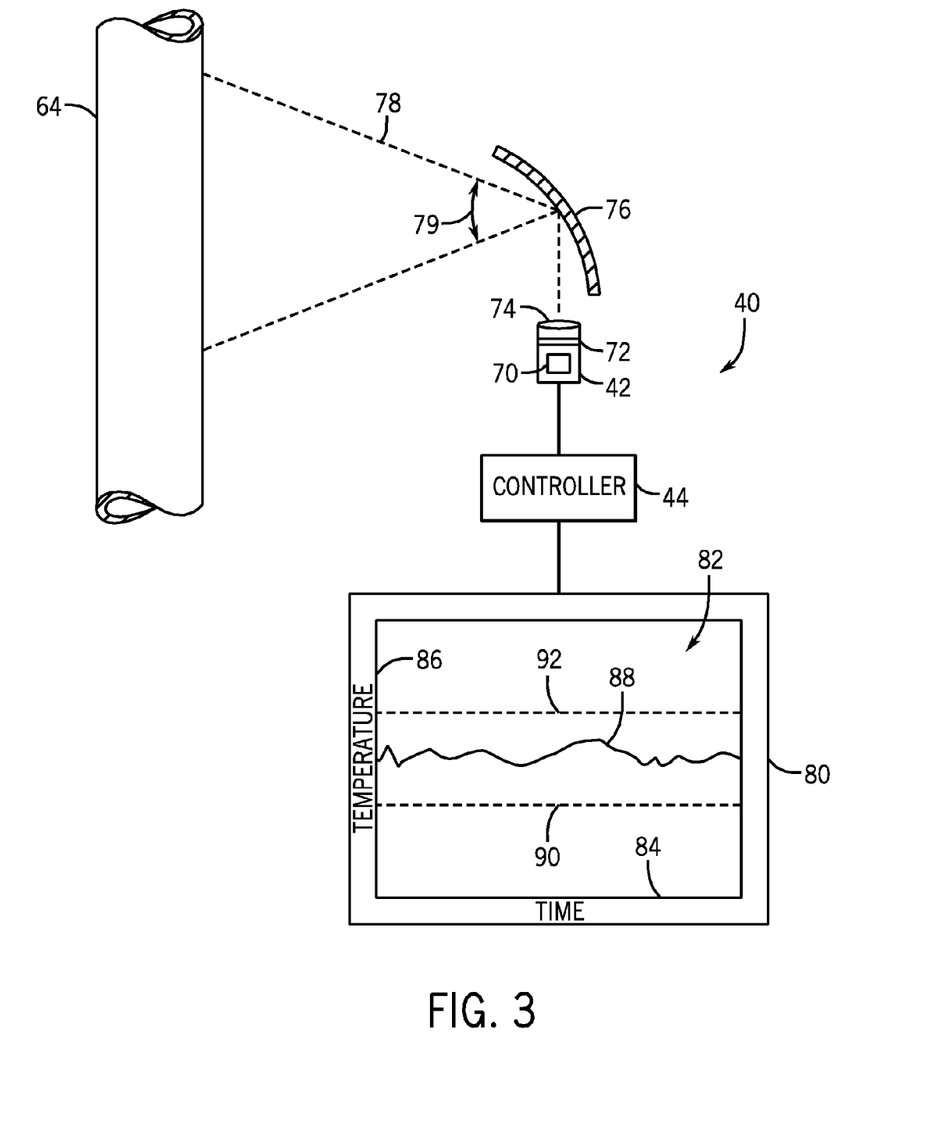
FIG. 3 is a block diagram of the thermal measurement system directed toward a fluid passage in accordance with certain embodiments of the present technique.

FIG. 3 is a block diagram of the thermal measurement system 40 directed toward a fluid passage, such as the illustrated fuel conduit 64. As illustrated, the thermal radiation sensor 42 includes a detector element 70, a filter 72 and a lens 74. In certain embodiments, the detector element 70 may be a thermopile including multiple thermocouples electrically connected in series to provide an enhanced output signal. As will be appreciated, thermopiles may detect a variety of thermal radiation frequencies. For example, certain thermopiles may detect electromagnetic wavelengths within the infrared spectrum ranging from approximately 0.8 to 40 microns. As will be further appreciated, a particular subset of wavelengths within the infrared spectrum may be well-suited for temperature determination. Consequently, the thermal radiation sensor 42 may employ a band-pass filter 72 to limit the range of wavelengths incident upon the detector element 70. For example, in certain embodiments, the band-pass filter 72 may be configured to block electromagnetic radiation having a wavelength outside of a range between approximately 2 to 20, 4 to 18, 6 to 16, or about 8 to 14 microns. Consequently, the filter 72 facilitates passages of thermal radiation onto the detector element 70 having a wavelength range suitable for the detector element 70 to output a signal having a magnitude proportional to the measured temperature.

It should be appreciated that alternative embodiments may employ other band-pass filters having other wavelength ranges. Furthermore, certain embodiments may employ a high-pass filter, a low-pass filter, or may omit the filter. Moreover, while a thermopile is employed in the present embodiment, it should be appreciated that other detector elements 70, such as a CCD or pyrometer, may be employed in alternative embodiments.

The present thermal radiation sensor 42 also includes an optical focusing device, such as the lens 74, configured to focus the thermal radiation onto the detector element 70. As will be appreciated, the lens 74 may be composed of any suitable material, such as plastic or glass. In certain embodiments, the lens 74 may be combined with the filter 72 into a single element. In further embodiments, the lens 74 may be omitted such that thermal radiation passes directly into the thermal radiation sensor 42.

The present embodiment also includes a second optical focusing device, such as the illustrated mirror 76. The minor is configured to direct thermal radiation from the desired region onto the thermal radiation sensor 42. The present embodiment employs a concave minor 76 to establish a desired field of view 78. Due to the shape of the minor 76 and the position of the thermal radiation sensor 42, a field of view 78 having an angle 79 is established. For example, in certain embodiments, the angle 79 may be greater than approximately 5, 10, 20, 40, 60, 80, 100, 120, 140 or 160 degrees, or more. As previously discussed, the accuracy of the thermal measurement system 40 may be at least partially dependent on the field of view 78 of the thermal radiation sensor 42. Therefore, smaller angles 79 may produce a more accurate temperature measurement than larger angles 79. The thermal radiation sensor 42 is configured to output a signal indicative of an average temperature within the field of view 78. Consequently, if fluid having a higher or lower temperature than the surrounding environment leaks from the conduit 64, the change in temperature of the region within the field of view 78 will be detected by the controller 44. It should be appreciated that alternative embodiments may employ a convex minor or a substantially flat minor to direct the thermal radiation toward the sensor 42. In further embodiments, the mirror 76 may be omitted, and the thermal radiation sensor 42 may be directed toward the region. In such embodiments, the lens 74, if present, may serve to establish a desired field of view 78 based on the shape and optical properties of the lens 74.

As previously discussed, the present thermal radiation sensor 42 includes a thermopile configured to convert detected thermal radiation into an output signal. Because the thermopile includes multiple thermocouples connected in series, the thermopile outputs an electrical signal having a magnitude proportional to a temperature of the region within the field of view 78. The controller 44 is configured to receive this signal, and to determine a temperature of the region based on the signal (e.g., via a look-up table, an algorithm, etc.). In the present embodiment, the controller 44 is communicatively coupled to a display 80 configured to present a graphical representation of the temperature of the region as a function of time. As illustrated, the display 80 includes a graph 82 having an x-axis 84 representative of time, and a y-axis 86 representative of temperature. A curve 88 represents the temperature of the region as a function of time. The graph 82 also includes a lower threshold 90 and an upper threshold 92, defining a normal operating temperature range.

As previously discussed, the thermal radiation sensor 42 is configured to output a signal indicative of the average temperature of the region within the field of view 78. If a fluid having a higher temperature than the surrounding environment leaks from a fluid passage, the detected temperature of the region will increase. Conversely, if a fluid having a lower temperature than the surrounding environment leaks from a fluid passage, the detected temperature of the region will decrease. Therefore, the upper threshold 92 may be set to a temperature above the normal operating temperature of the conduit 64 and/or the lower threshold 90 may be set to a temperature below the normal operating temperature of the conduit 64. In this configuration, a temperature rise above the upper threshold 92 may be indicative of a hot fluid leak, and a temperature decrease below the lower threshold 90 may be indicative of a cold fluid leak.

In certain embodiments, only fluid passages conveying fluid having a higher temperature than the surrounding environment may be present within the field of view 78. In such embodiments, only an upper threshold 92 may be employed to detect a fluid leak. Consequently, the controller 44 will not identify a fluid leak based on a temperature drop. In further embodiments, only fluid passages conveying fluid having a lower temperature than the surrounding environment may be present within the field of view 78. In such embodiments, only a lower threshold 90 may be employed to detect a fluid leak. In yet further embodiments, both high temperature and lower temperature fluids may pass through the field of view 78. Such embodiments may include both the lower threshold 90 and the upper threshold 92 to identify a leak if the temperature deviates from the normal operating range.

Figure 4:
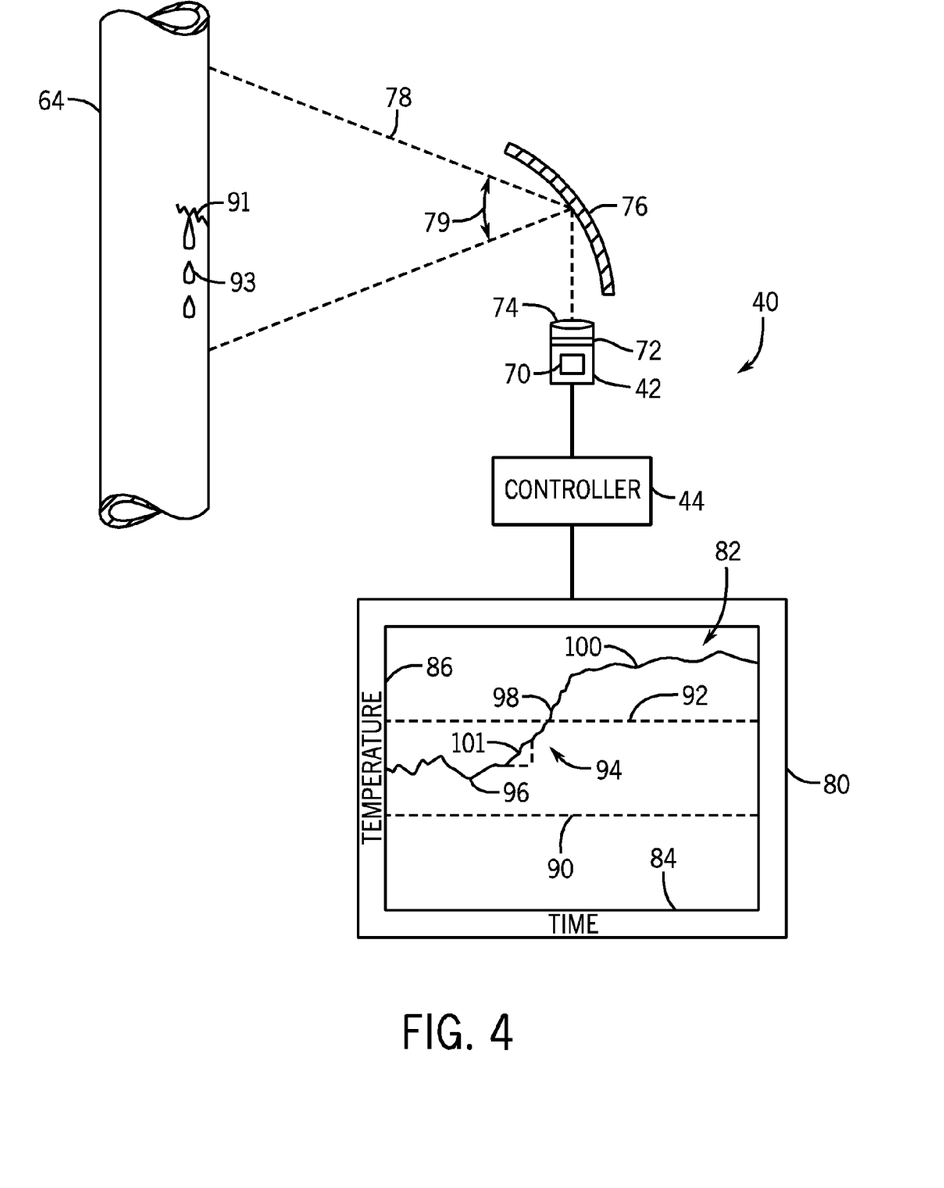
FIG. 4 is a block diagram of the thermal measurement system, as shown in FIG. 3, in which fluid is leaking from the fluid passage in accordance with certain embodiments of the present technique.

FIG. 4 is a block diagram of the thermal measurement system 40, as shown in FIG. 3, in which fluid is leaking from the fluid passage 64. As illustrated, a crack 91 is present within the conduit 64, thereby establishing an opening for fluid 93 to leak from the conduit 64. As previously discussed, the present conduit 64 may contain heated liquid fluid. Consequently, the temperature of the fluid 93 may be greater than the temperature of the surrounding environment. As a result, the fluid leakage increases the temperature of the region within the field of view 78. As illustrated by the graph 82, this increase in temperature is detected by the controller 44 and presented in the display 80.

As illustrated, the graph 82 includes a curve 94 which represents temperature of the region within the field of view 78 as a function of time. The curve 94 includes a first portion 96 representative of the temperature of the region prior to the leak, a second portion 98 representative of the temperature during initiation of the leak, and a third portion 100 representative of the temperature after the leak has developed. As illustrated, the temperature of the first portion 96 is lower than the upper threshold 92, indicating that no leak is present within the conduit 64. The temperature of the second portion 98 progressively increases as the hot fluid leaks into the region within the field of view 78. The controller 44 will identify a leak within the fluid conduit 64 when the temperature increases above the upper threshold 92. In the present embodiment, the substantially constant temperature of the third portion 100 may indicate that a steady stream of fluid is leaking from the conduit 64, thereby establishing an elevated steady state temperature of the region within the field of view 78.

In embodiments where the conduit 64 transports fluid having a temperature lower than the surrounding environment, the controller 44 may detect a leak when the temperature of the region within the field of view 78 decreases below the lower threshold 90. In alternative embodiments, the controller 44 may be configured to detect a leak based on the rate of temperature change. For example, the controller 44 may be configured to compute a slope 101 of the temperature curve 94, and compare the slope 101 to a threshold value indicative of a leak within the conduit 64. For example, a higher slope may be indicative of a leak, while a lower slope may be indicative of a desired change in operating conditions (e.g., intentionally increasing the temperature of the fuel). In further embodiments, the slope and temperature may be compared to separate threshold values to determine whether fluid is leaking from the conduit 64. While the configuration discussed above referenced the conduit 64, it should be appreciated that other conduits and/or regions of the power generation system 10 and/or turbine system 12 may be thermally monitored to detect a fluid leak.

Because the thermal radiation sensor 42 may be sensitive enough to detect minute variations in temperature of the region within the field of view 78, a leaking conduit may be identified more rapidly than leak detection systems employing vibration measurement, resistivity, or optical detection. As will be appreciated, the overall sensitivity of the thermal measurement system 40 may be dependent on the sensitivity of the thermal radiation sensor 42, the accuracy of the thermal radiation sensor 42, optical and/or electrically noise within the system 40, the accuracy of a signal conditioner within the controller 44, the quality of the thermal radiation sensor optics, the field of view of the thermal radiation sensor 42 and/or the techniques used by the controller 44 to compute temperature, among other factors. For example, in certain embodiments, the thermal measurement system 40 may be able to identify temperature variations of less than approximately 2, 1, 0.75, 0.5, or 0.25 degrees Fahrenheit, or less. Consequently, the thermal measurement system 40 may detect a leaking conduit prior to significant fluid leakage, thereby enabling an operator to quickly respond to the condition. Furthermore, because the field of view 78 may cover a large region of the conduit 64, power generation system 10 and/or turbine system 12, fewer sensors 42 may be employed to detect fluid leaks throughout the conduit/system, as compared to other leak detection devices (e.g., visual, vibration, etc.). As a result, the present thermal measurement system 40 may be less expensive to deploy and maintain.

Figure 5:
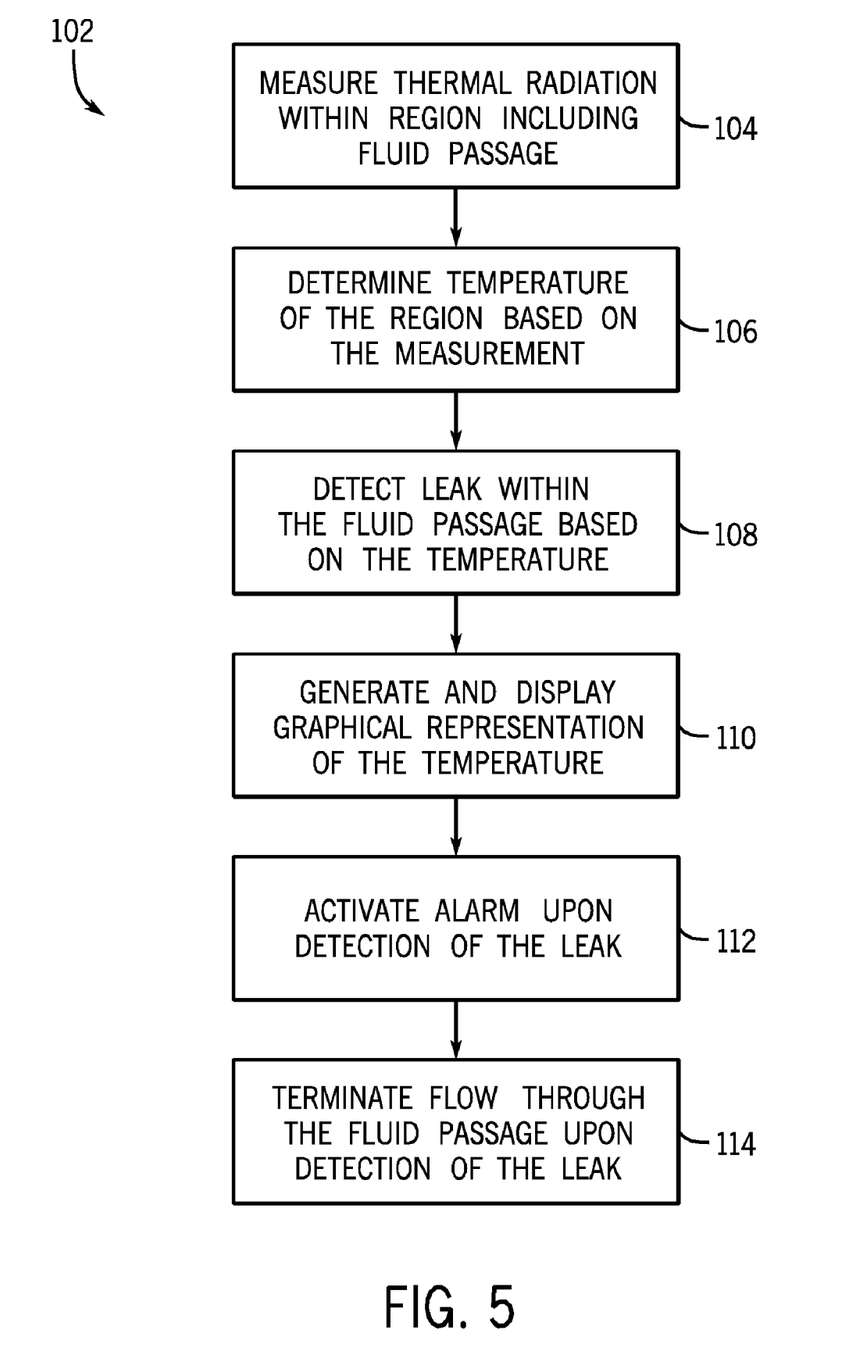
FIG. 5 is a flowchart of a method for detecting a leak within a fluid passage by measuring thermal radiation within a region including the fluid passage in accordance with certain embodiments of the present technique.

FIG. 5 is a flowchart of a method 102 for detecting a leak within a fluid passage by measuring thermal radiation within a region including the fluid passage. First, as represented by block 104, thermal radiation is measured within a region including the fluid passage. As previously discussed, the thermal radiation may be measured by a thermal radiation sensor 42, such as a thermopile. Next, as represented by block 106, a temperature of the region is determined based on the thermal radiation measurement. For example, the thermopile may generate a signal having a magnitude proportional to the average temperature of the region. The controller 44 may then receive this signal and determine the temperature based on the signal magnitude. A leak within the fluid passage may then be detected based on the measured temperature, as represented by block 108. For example, as previously discussed, the temperature of the region may be compared to a threshold value indicative of a leak. Alternatively, a rate of temperature change may be compared to a threshold value to determine whether a leak is present within the fluid passage.

Next, as represented by block 110, a graphical representation of the temperature may be generated and displayed. For example, the display 80 may present a curve showing the temperature as a function of time. Alternatively, a numerical representation of temperature may be displayed. If a leak is detected, an audible and/or visual alarm may be activated to alert an operator of the condition, as represented by block 112. For example, once an operator has been informed of the condition, the operator may terminate fluid flow through the leaking conduit, thereby substantially reducing additional fluid loss and/or ensuring the structural integrity of the system containing the fluid passage. In addition, flow through the fluid passage may be automatically terminated upon detection of a leak, as represented by block 114. For example, in certain embodiments, the controller 44 may be communicatively coupled to the system including the fluid passage, and configured to deactivate the system upon detection of a leak.

It should be appreciated that alternative actions may be taken by the operator and/or the controller 44 if a leak is detected. For example, in certain embodiments, the leaking fluid passage may be utilized for cooling operations. In such embodiments, the system receiving the cooling fluid may be shut down prior to terminating flow through the fluid passage. Alternatively, flow through the fluid passage may be decreased and/or modulated via a valve. Such an operation may enable the system which utilizes the fluid to continue operation and/or may facilitate a system shut-down procedure. In further embodiments, fluid flow may be slowly terminated through the leaking passage while fluid flow through an alternative intact passage is increased, thereby providing a continuous supply of fluid to the system.

While the thermal measurement system 40 has been described above with reference to detecting leaks within fluid conduits, it should be appreciated that the present embodiments may be employed to detect leaks within other fluid passages. For example, the thermal measurement system 40 may be utilized to detect leaks within valves, seals, connectors, joints, or other passages configured to convey a fluid. Furthermore, it should be appreciated that the thermal measurement system 40 may be employed to detect fluid leaks from components of the power generation system 10 and/or the turbine system 12. For example, the thermal measurement system 40 may be capable of detecting steam leaks within the HP ST 30, IP ST 28, LP ST 26, or other components of the power generation system 10. In addition, the thermal measurement system 40 may be capable of detecting fluid leaks from the compressor 20, combustor 18 and/or turbine 16 of the turbine system 12. Moreover, the present thermal measurement system 40 may be utilized to detect fluid leaks from components of other systems, such as processing plants, oil refineries or combustion engines, for example.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
    a thermal radiation sensor directed toward a region including at least one fluid passage, wherein the thermal radiation sensor comprises a thermopile configured to detect thermal radiation emitted by fluid leaking from the at least one fluid passage, and to output a signal indicative of a temperature of the region; and
    a controller communicatively coupled to the thermal radiation sensor, wherein the controller is configured to detect a leak within the at least one fluid passage based on the signal.

2. The system of claim 1, comprising an optical focusing device configured to focus the thermal radiation onto the thermal radiation sensor.

3. The system of claim 2, wherein the optical focusing device comprises a mirror, a lens, or a combination thereof.

4. The system of claim 1, comprising a band-pass filter disposed between the thermal radiation sensor and the region, wherein the band-pass filter is configured to block passage of electromagnetic radiation having wavelengths less than approximately 2 microns and wavelengths greater than approximately 20 microns.

5. The system of claim 1, wherein the band-pass filter is configured to block passage of electromagnetic radiation having wavelengths less than approximately 4 microns and wavelengths greater than approximately 18 microns.

6. The system of claim 5, wherein the band-pass filter is configured to block passage of electromagnetic radiation having wavelengths less than approximately 6 microns and wavelengths greater than approximately 16 microns.

7. The system of claim 6, wherein the band-pass filter is configured to block passage of electromagnetic radiation having wavelengths less than approximately 8 microns and wavelengths greater than approximately 14 microns.

8. The system of claim 1, wherein the thermal radiation sensor is configured to detect thermal radiation having a frequency within an infrared spectrum.

9. The system of claim 1, wherein the controller is configured to detect the leak within the at least one fluid passage if the temperature of the region exceeds a first threshold value, decreases below a second threshold value, or a combination thereof.

10. The system of claim 1, wherein the controller is configured to detect the leak within the at least one fluid passage if a rate of change of the temperature of the region exceeds a third threshold value.

11. The system of claim 1, comprising a power generation system including the at least one fluid passage.

12. A system comprising:
    a controller configured to receive a signal from a thermal radiation sensor indicative of a temperature of a region including at least one fluid passage, wherein the controller is configured to detect a leak within the at least one fluid passage based on the signal, and the thermal radiation sensor comprises a thermopile configured to detect thermal radiation emitted by fluid leaking from the at least one fluid passage.

13. The system of claim 12, wherein the controller is configured to detect the leak within the at least one fluid passage by comparing the temperature of the region to a threshold value.

14. The system of claim 12, wherein the controller is configured to generate a graphical representation of the temperature of the region.

15. The system of claim 12, wherein the controller is configured to activate an audible or visual alarm upon detection of the leak within the at least one fluid passage.

16. The system of claim 12, comprising a gas turbine system including the at least one fluid passage.

17. The system of claim 12, wherein the controller is configured to detect the leak within the at least one fluid passage by comparing a rate of change of the temperature of the region to a threshold value.

18. A method comprising:
    measuring thermal radiation within a region including at least one fluid passage via a thermopile configured to detect thermal radiation emitted by fluid leaking from the at least one fluid passage;
    determining a temperature of the region based on the measurement; and
    detecting a leak within the at least one fluid passage based on the temperature of the region.

19. The method of claim 18, wherein detecting the leak within the at least one fluid passage comprises comparing the temperature of the region to a threshold temperature.

20. The method of claim 18, comprising generating and displaying a graphical representation of the temperature of the region.

21. The method of claim 18, comprising activating an audible or visual alarm upon detection of the leak within the at least one fluid passage.

22. The method of claim 18, comprising terminating flow through the at least one fluid passage upon detection of the leak within the at least one fluid passage.

23. The method of claim 18, wherein detecting the leak within the at least one fluid passage comprises comparing a rate of change of the temperature of the region to a threshold rate.

* * * * *